(12) United States Patent
Rashid et al.

(10) Patent No.: US 9,699,324 B1
(45) Date of Patent: Jul. 4, 2017

(54) FRAMEWORK FOR UNLICENSED SPECTRUM USAGE MONITORING AND REPORTING IN LTE NETWORKS

(71) Applicant: Intel Corporation, Santa Clara, CA (US)

(72) Inventors: Mohammad Mamunur Rashid, Hillsboro, OR (US); Kathiravetpillai Sivanesan, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,068

(22) Filed: Dec. 24, 2015

(51) Int. Cl.
*H04W 4/24* (2009.01)
*H04M 15/00* (2006.01)
*H04W 24/10* (2009.01)
*H04L 12/14* (2006.01)
*H04L 12/26* (2006.01)

(52) U.S. Cl.
CPC ........ *H04M 15/66* (2013.01); *H04L 12/1407* (2013.01); *H04L 43/062* (2013.01); *H04W 4/24* (2013.01); *H04W 24/10* (2013.01)

(58) Field of Classification Search
CPC ....... H04M 15/66; H04W 4/24; H04W 24/10; H04L 43/062; H04L 12/1407
See application file for complete search history.

(56) References Cited

U.S. PATENT DOCUMENTS

| 2011/0075675 | A1* | 3/2011 | Koodli | H04L 12/14 370/401 |
| 2011/0202647 | A1* | 8/2011 | Jin | H04L 41/0806 709/223 |
| 2016/0315751 | A1* | 10/2016 | Chandwani | H04L 5/0094 |

* cited by examiner

*Primary Examiner* — Chuong A Ngo
(74) *Attorney, Agent, or Firm* — Carrie A Boone PC

(57) ABSTRACT

An unlicensed spectrum usage monitoring and reporting method is disclosed. The unlicensed spectrum usage monitoring and reporting method employs a new logical entity in a Long Term Evolution (LTE) enhanced Node B (eNB) as well as a dedicated interface between the eNB and the Policy and Charging Enforcement Function (PCEF). The method employs a diameter-based protocol for communication between the eNB and the PCEF, and defines several new Attribute-Pair Values (AVPs) and message commands to enable exchange of unlicensed spectrum usage information for User Equipment (UE) operating in the LTE network.

22 Claims, 26 Drawing Sheets

Evolved Packet System (EPS) architecture 80 with E-UTRAN access

--- control plane
——— user plane

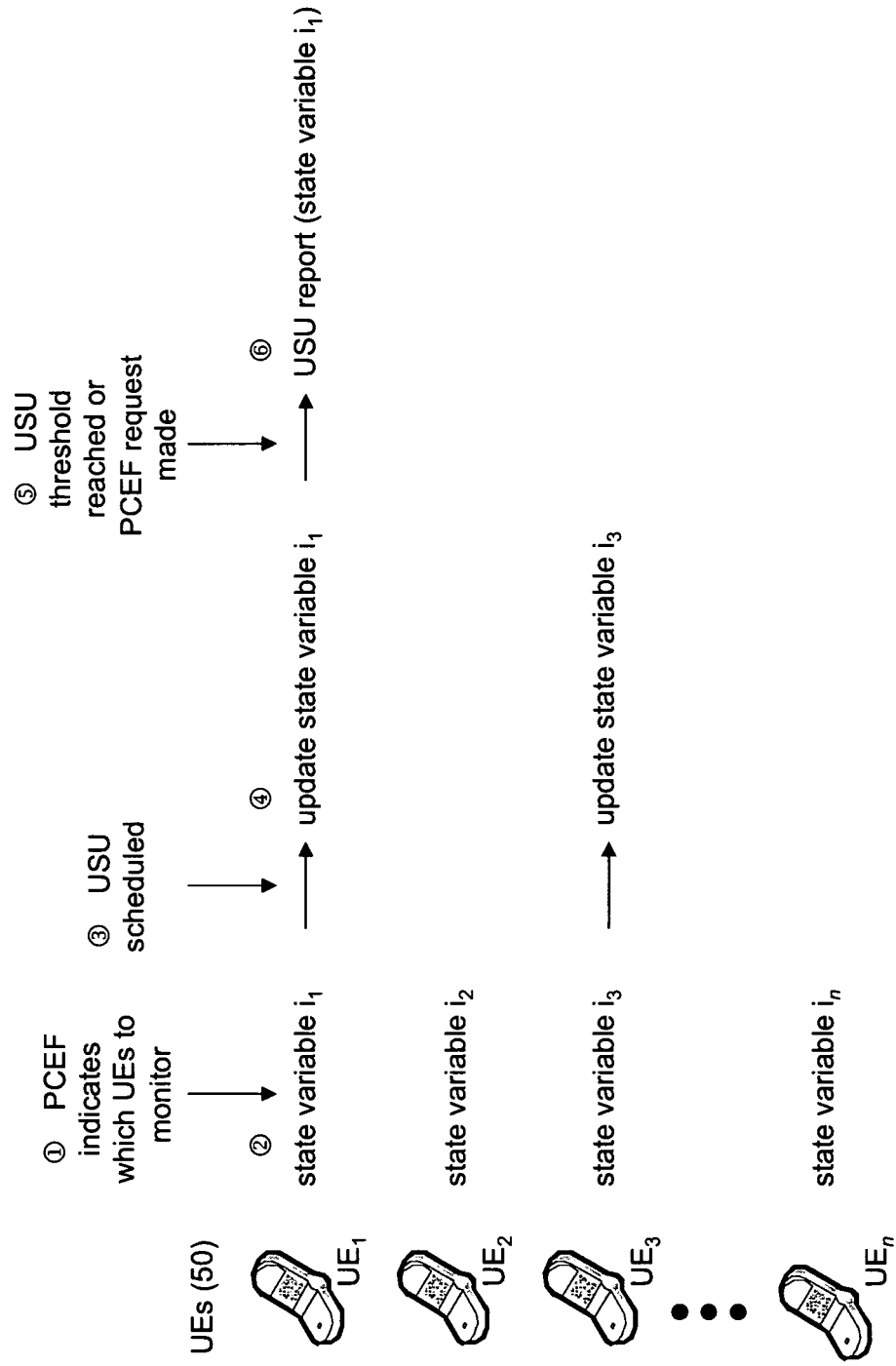

Figure 5

Attribute-Value Pairs:

| Attribute Name | AVP code | Value Type |
|---|---|---|
| Unlicensed-Spectrum-Usage-Monitoring-Config-Definition | 2889 | Grouped |
| Unlicensed-Spectrum-Usage-Monitoring-Key | 2890 | OctetString |
| Unlicensed-Spectrum-Usage-UE-ID | 2891 | OctetString |
| Unlicensed-Spectrum-Usage-Flow-Definition | 2892 | Grouped |
| Unlicensed-Spectrum-Usage-Reporting-Level | 2893 | Enumerated |
| Unlicensed-Spectrum-Usage-Reporting-Threshold | 2894 | Unsigned32 |
| Unlicensed-Spectrum-Usage-Amount | 2895 | Unsigned32 |
| Unlicensed-Spectrum-Usage-Monitoring-Config-Add | 2896 | Grouped |
| Unlicensed-Spectrum-Usage-Monitoring-Config-Query | 2897 | Grouped |
| Unlicensed-Spectrum-Usage-Report-ID | 2898 | OctetString |
| Unlicensed-Spectrum-Usage-Report | 2899 | Grouped |
| Unlicensed-Spectrum-Usage-Report-Get | 2900 | Grouped |
| Unlicensed-Spectrum-Usage-Monitoring-Config-Delete | 2901 | Grouped |
| Unlicensed-Spectrum-Usage-Last-Reporting-Time | 2902 | Time |
| Unlicensed-Spectrum-Usage-Amount | 2903 | Unsigned32 |

Unlicensed-Spectrum-Usage-Monitoring-Config-Definition AVP format:

Unlicensed-Spectrum-Usage-Monitoring-Config-Definition::= < AVP Header : 2889 >

[ Unlicensed-Spectrum-Usage-Monitoring-Key ]

[ Unlicensed-Spectrum-Usage-UE-ID ]

* [ Unlicensed-Spectrum-Usage-Flow-Definition ]

[ Unlicensed-Spectrum-Usage-Reporting-Level ]

[ Unlicensed-Spectrum-Usage-Reporting-Threshold ]

* [ AVP ]

Figure 8

Unlicensed-Spectrum-Usage-Flow-Definition AVP format:

Unlicensed-Spectrum-Usage-Flow-Definition::= < AVP Header : 2892 >
[ Traffic-Flow-ID ]
[ Source-IP ]
[ Destination-IP ]
* [ IP-Port-Number ]
* [ AVP ]

Unlicensed-Spectrum-Usage-Monitoring-Config-Add AVP format:

Unlicensed-Spectrum-Usage-Monitoring-Config-Add::= < AVP Header : 2896 >
\* [ Unlicensed-Spectrum-Usage-Monitoring-Config-Definition ]
\* [ AVP ]

Unlicensed-Spectrum-Usage-Monitoring-Config-Query AVP format:

Unlicensed-Spectrum-Usage-Monitoring-Config-Query::= < AVP Header : 2897 >
[ Unlicensed-Spectrum-Usage-UE-ID ]
[ Unlicensed-Spectrum-Usage-Flow-Definition ]
* [ AVP ]

Unlicensed-Spectrum-Usage-Report AVP format:

Unlicensed-Spectrum-Usage-Report::= < AVP Header : 2899 >

[ Unlicensed-Spectrum-Usage-Monitoring-Key ]

[ Unlicensed-Spectrum-Usage-Report-ID ]

[ Unlicensed-Spectrum-Usage-Last-Reporting-Time ]

[ Unlicensed-Spectrum-Usage-Amount ]

* [ AVP ]

Unlicensed-Spectrum-Usage-Report-Get AVP format:

Unlicensed-Spectrum-Usage-Report-Get::= < AVP Header : 2900 >
  * [ Unlicensed-Spectrum-Usage-Monitoring-Key ]
  * [ AVP ]

CC-Request (CCR) Command Message Format:

```
<CC-Request> ::= < Diameter Header: 272, REQ, PXY >
                 < Session-Id >
                 { Auth-Application-ID }
                 { Origin-Host }
                 { Origin-Realm }
                 { Destination-Realm }
                 { CC-Request-Type }
                 { CC-Request-Number }
                 [ Credit-Management-Status ]
                 [ Destination-Host ]
                 [ Origin-State-Id ]
               * [ Unlicensed-Spectrum-Usage-Monitoring-Config-Query ]
               * [ Unlicensed-Spectrum-Usage-Report ]
               * [ Proxy-Info ]
               * [ Route-Record ]
               * [ AVP ]
```

Figure 15

CC-Answer (CCA) Command Message Format:

```
<CC-Answer> ::= < Diameter Header: 272, PXY >
                < Session-Id >
                { Auth-Application-ID }
                { Origin-Host }
                { Origin-Realm }
                { Result-Code }
                { Experimental-Result }
                { CC-Request-Type }
                { CC-Request-Number }
                [ Origin-State-Id ]
                [ Redirect-Host ]
                [ Redirect-Host-Usage ]
                [ Redirect-Max-Cache-Time ]
              * [ Unlicensed-Spectrum-Usage-Monitoring-Config-Add ]
                [ Error-Message ]
                [ Error-Reporting-Host ]
              * [ Failed-AVP ]
              * [ Proxy-Info ]
              * [ Route-Record ]
              * [ Supported-Features ]
              * [ AVP ]
```

Figure 16

Re-Auth-Request (RAR) Command Message Format:

<RA-Request> ::= < Diameter Header: 258, REQ, PXY >
< Session-Id >
{ Auth-Application-ID }
{ Origin-Host }
{ Origin-Realm }
{ Destination-Realm }
{ Destination-Host }
{ Re-Auth-Request-Type }
[ Session-Release-Cause ]
[ Origin-State-Id ]
* [ Unlicensed-Spectrum-Usage-Monitoring-Config-Add ]
* [ Unlicensed-Spectrum-Usage-Monitoring-Config-Delete ]
* [ Unlicensed-Spectrum-Usage-Report-Get ]
* [ Proxy-Info ]
* [ Route-Record ]
* [ AVP ]

Figure 17

Re-Auth-Answer (RAA) Command Message Format:

```
<RA-Answer> ::= < Diameter Header: 258, PXY >
                < Session-Id >
                { Origin-Host }
                { Origin-Realm }
                [ Result-Code ]
                [ Experimental-Result ]
                [ Origin-State-Id ]
              * [ Unlicensed-Spectrum-Usage-Report ]
                [ Event-Report-Indication ]
                [ Error-Message ]
              * [ Error-Reporting-Host ]
              * [ Failed-AVP ]
              * [ Proxy-Info ]
              * [ AVP ]
```

Figure 18

Signalling radio bearer: SRB1
RLC-SAP: AM
Logical channel: DCCH
Direction: E-UTRAN to UE

*IdentityRequest* message

-- ASN1START

```
IdentityRequest – rXX ::=    SEQUENCE (
    identityType                  ENUMERATED ( IMSI ),      OPTIONAL,   -- Need OP
    lateNonCriticalExtension      OCTET STRING              OPTIONAL,   -- Need OP
    nonCriticalExtension          SEQUENCE ( )
)
```

-- ASN1STOP

*IdentityRequest* field descriptions

*IdentityType*
The type of UE identity the E-UTRAN is requesting from the UE. Such identities are known to the UE but not necessarily by the E-UTRAN, IMSI is one such identity

Figure 19

Signalling radio bearer: SRB1
RLC-SAP: AM
Logical channel: DCCH
Direction: UE to E-UTRAN

*IdentityResponse message*

-- ASN1START

IdentityResponse – rXX ::=    SEQUENCE (
    requestedIdentityValue        OCTET STRING            OPTIONAL, -- Need OP
    lateNonCriticalExtension      OCTET STRING            OPTIONAL, -- Need OP
    nonCriticalExtension          SEQUENCE ( )
)

-- ASN1STOP

*IdentityResponse field descriptions*

*requestedIdentityValue*
The value of the UE identity sought by the E-UTRAN in the IdentityRequest message

FRAMEWORK FOR UNLICENSED SPECTRUM USAGE MONITORING AND REPORTING IN LTE NETWORKS

TECHNICAL FIELD

This application relates to unlicensed spectrum usage in LTE networks and, more particularly, to a mechanism for monitoring and reporting the unlicensed spectrum usage.

BACKGROUND

The Evolved Packet Core (EPC) is the core network of advanced mobile communication systems. The EPC allows different radio access technologies (RATs) to operate in an integrated manner. These radio access technologies include first generation wireless Local Area Networks (LANs), second generation (2G) systems, such as Global System for Mobile communication, or GSM, third generation (3G) systems, such as the Universal Mobile Telecommunication System (UMTS), and fourth generation (4G) systems, such as Long Term Evolution (LTE).

FIG. 1 is a basic architecture of an Evolved Packet System (EPS) 80. An User Equipment (UE) 50 connects to the EPC 70 over the LTE access network known as E-UTRAN (short for Evolved UMTS Terrestrial Radio Access Network) 44 and communicates with a base station known as the Evolved Node B (eNB) 40. EPS generally refers to a complete system consisting of the UE, the EUTRAN, and the core network (EPC).

The EPC is a packet-switched network in which the Internet Protocol (IP) is used for all transport services. The EPC is part of the 3$^{rd}$ Generation Partnership Project (3GPP) specification.

The EPC 70 consists of a Serving Gateway (S-GW) 30, a Packet Data Network Gateway (P-GW) 32, a Mobility Management Entity (MME) 34, and a Home Subscriber Server (HSS) 36. The EPC 70 connects to external networks 38, in this case, including an Internet Protocol Multimedia Subsystem (IMS) 42. User data and signaling are independent, with user data occupying a user plane (solid lines) and signaling occupying a control plane (dashed lines).

LTE in unlicensed spectrum (LTE-U) is a proposal for the use of unlicensed spectrum by LTE devices. The unlicensed spectrum consists of the 5 GHz band used by WiFi devices. Cellular devices are usually limited to the part of the radio spectrum in which they are licensed. LTE-U allows these devices to share space with WiFi equipment without requiring the device to log into the separate WiFi network. This allows data from/to the cellular device to utilize both the provider's carrier frequencies and the unlicensed 5 GHz spectrum.

As illustrated in FIG. 2, a Policy and Charging Control (PCC) interface 150 is used by LTE for monitoring and reporting licensed spectrum usage. The PCC includes a Policy and Charging Rules Function (PCRF) and a Policy and Charging Enforcement Function (PCEF). The PCRF generates rules enforced by the PCEF, which provides user traffic handling and Quality of Service (QoS) at the P-GW 32 over the user plane. The PCEF further provides service data flow detection and is able to differentiate between online and offline charging interactions.

The PCEF 160, part of the P-GW 32, communicates with the PCRF 140 over a Gx interface. The PCEF 160 also connects to both an online charging system (OCS) 154 and an offline charging system (OFCS) 156, via Gy and Gz interfaces, respectively. The PCRF 140 connects with an application function 130 over an Rx interface.

For unlicensed spectrum usage by the user equipment, the operators (e.g., AT&T or Verizon) may have different charging policies or rates. For example, data downloads may incur one charge while voice calls may incur a different charge, even though both operations are performed by the same user equipment. Currently, data usage is monitored and charged in the core network. This is because all the data go through the PCEF entity 160 in the P-GW 32.

However, with LTE-U enabled networks, where the unlicensed spectrum is utilized through carrier aggregation with the licensed spectrum, the PCEF 160 is unable to differentiate between data going through licensed and unlicensed spectrum. Only the eNB 40 is able to monitor such usage due to its direct involvement in scheduling resources over both the licensed and unlicensed spectrum at the air interface.

Currently, eNB does not have any role in user's data usage monitoring and charging aspects. As a result, with the currently standardized LTE systems, when unlicensed spectrum is leveraged through LTE-U technology, a mechanism to effectively monitor and report (and thus charge users) is beyond the current capabilities of the LTE network.

Thus, there is a desire for unlicensed spectrum monitoring and reporting that overcomes the shortcomings of the prior art

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 4 is a diagram of operations performed by the unlicensed spectrum usage monitoring element inside an eNB performing the unlicensed spectrum usage monitoring and reporting method of FIG. 3, according to some embodiments;

FIG. 5 is a table of Attribute-Value Pairs (AVPs) used by the unlicensed spectrum usage monitoring and reporting method of FIG. 3, according to some embodiments;

FIG. 8 illustrates the Unlicensed-Spectrum-Usage-Monitoring-Config-Definition AVP used by the unlicensed spectrum usage monitoring and reporting method of FIG. 3, according to some embodiments;

FIG. 9 illustrates the Unlicensed-Spectrum-Usage-Flow-Definition AVP used by the unlicensed spectrum usage monitoring and reporting method of FIG. 3, according to some embodiments;

FIG. 10 illustrates the Unlicensed-Spectrum-Usage-Monitoring-Config-Add AVP used by the unlicensed spectrum usage monitoring and reporting method of FIG. 3, according to some embodiments;

FIG. 11 illustrates the Unlicensed-Spectrum-Usage-Monitoring-Config-Query AVP used by the unlicensed spectrum usage monitoring and reporting method of FIG. 3, according to some embodiments;

FIG. 12 illustrates the Unlicensed-Spectrum-Usage-Report AVP used by the unlicensed spectrum usage monitoring and reporting method of FIG. 3, according to some embodiments;

FIG. 13 illustrates the Unlicensed-Spectrum-Usage-Report-Get AVP used by the unlicensed spectrum usage monitoring and reporting method of FIG. 3, according to some embodiments;

FIG. 14 illustrates the Credit Control Request command format used by the unlicensed spectrum usage monitoring and reporting method of FIG. 3, according to some embodiments;

FIG. 15 illustrates the Credit Control Answer command format used by the unlicensed spectrum usage monitoring and reporting method of FIG. 3, according to some embodiments;

FIG. 16 illustrates the Re-Auth Request command format used by the unlicensed spectrum usage monitoring and reporting method of FIG. 3, according to some embodiments;

FIG. 17 illustrates the Re-Auth Answer command format used by the unlicensed spectrum usage monitoring and reporting method of FIG. 3, according to some embodiments;

FIG. 18 illustrates the Identity Request command format used by the unlicensed spectrum usage monitoring and reporting method of FIG. 3, according to some embodiments;

FIG. 19 illustrates the Identity Response command format used by the unlicensed spectrum usage monitoring and reporting method of FIG. 3, according to some embodiments;

DETAILED DESCRIPTION

In accordance with the embodiments described herein, an unlicensed spectrum usage monitoring and reporting method is disclosed. The unlicensed spectrum usage monitoring and reporting method employs a new logical entity in a Long Term Evolution (LTE) enhanced Node B (eNB) as well as a dedicated interface between the eNB and the Policy and Charging Enforcement Function (PCEF). The method employs a Diameter-based protocol for communication between the eNB and the PCEF, and defines several new Attribute-Pair Values (AVPs) and message commands to enable exchange of unlicensed spectrum usage information for User Equipment (UE) operating in the LTE network.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosed embodiments. The following detailed description is, therefore, not to be construed in a limiting sense, as the scope of the subject matter is defined by the claims.

Figure 2:
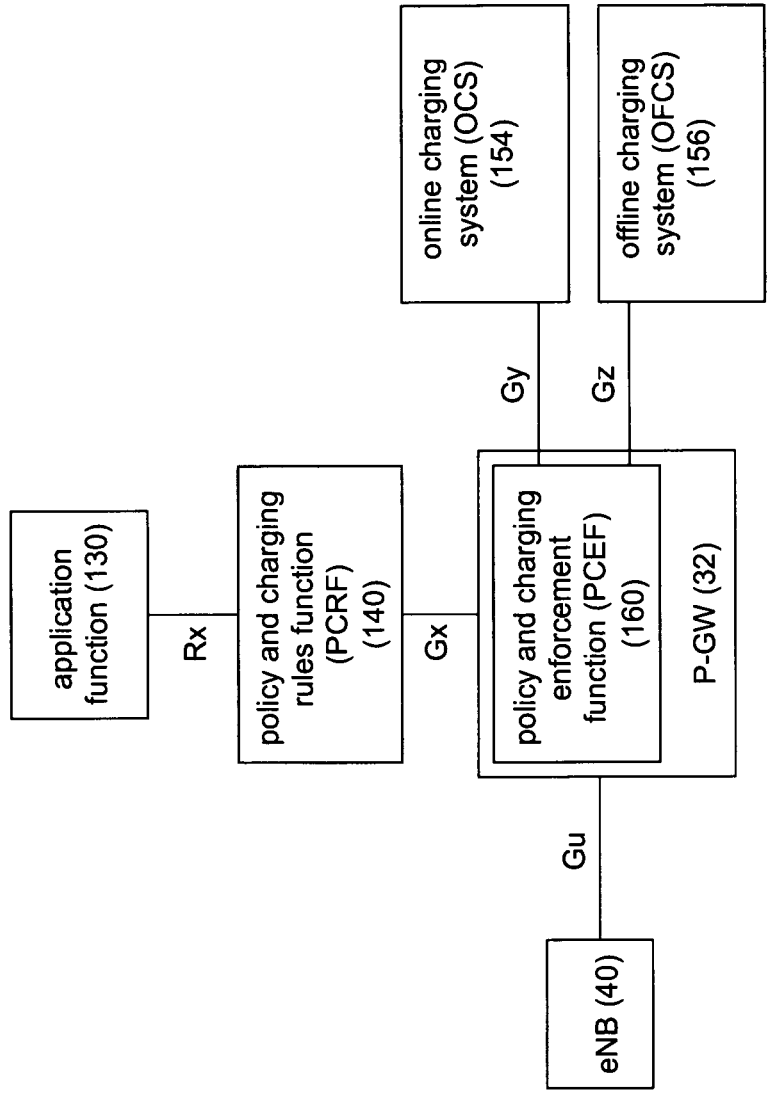
FIG. 2 is a diagram of a Policy and Charging Control interface to be utilized by the unlicensed spectrum usage monitoring and reporting method of FIG. 3, according to some embodiments.
Figure 3:
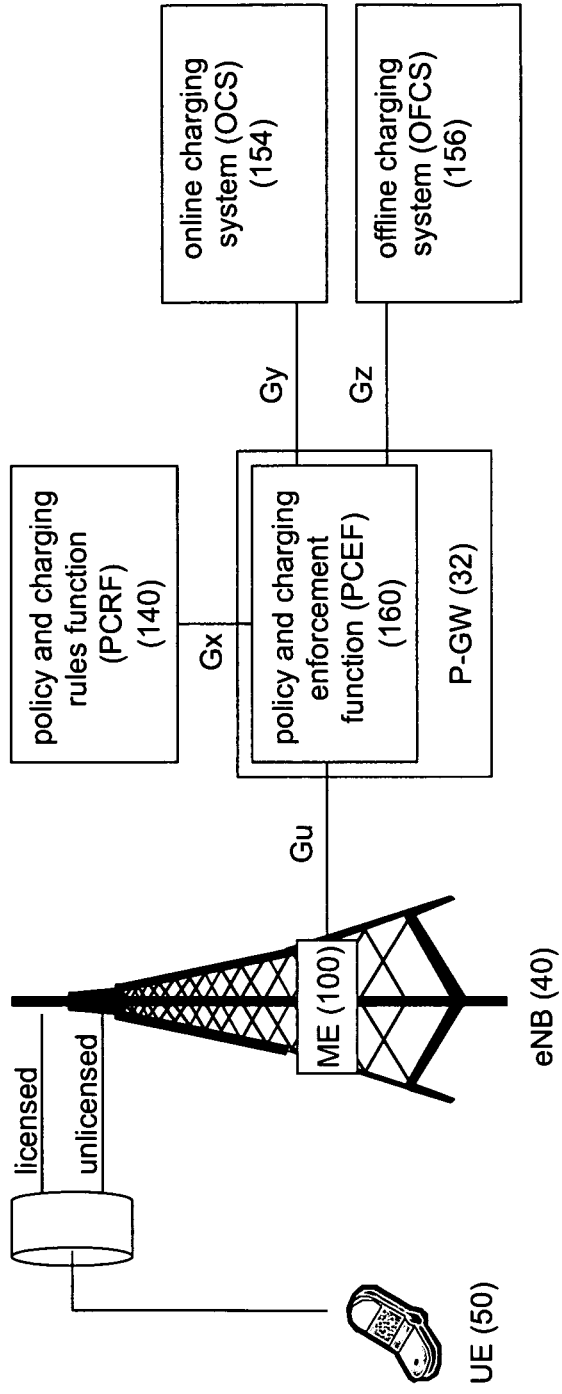
FIG. 3 is a diagram of an unlicensed spectrum usage monitoring and reporting method, according to some embodiments.

FIG. 3 is a simplified diagram of the unlicensed spectrum usage monitoring and reporting (USUMR) method 200, according to some embodiments. The USUMR method 200 consists of a logical entity, an unlicensed spectrum usage monitoring entity (USUME) 100, also known herein as the monitoring entity (ME) 100, which is part of the eNB 40, as well as a dedicated interface, denoted Gu, disposed between the eNB 40 and the PCEF 160 (the Gu interface is also shown in FIG. 2). Gx, Gy, and Gz interfaces, already present in current LTE networks, continue to exist, with the Gx interface being disposed between the PCEF 160 and the PCRF 140, the Gy interface between the PCEF and the OCS 154, and the Gz interface between the PCEF and the OFCS 156. The ME 100 is able to monitor the amount of resource usage by the UE 50 over both licensed and unlicensed spectrum.

In some embodiments, the Gu interface employs a Diameter protocol. The Diameter protocol is a message-based authentication, authorization, and accounting protocol for computer networks. The Diameter protocol uses attribute-value pairs (AVPs) and commands that may be expanded to provide network transport between entities. Through the Diameter-based protocol interface Gu, the eNB 40 can convey the unlicensed spectrum usage reports and also receive from the PCEF 160 the instructions/parameters relevant for performing the monitoring and reporting of the unlicensed spectrum usage by the UE 50.

In some embodiments, the PCEF 160 generates Charge Data Records (CDRs) that include or take into consideration information regarding reported unlicensed spectrum usage received from one or more eNBs in the cellular network. Using the CDR specifying the amount of resource consumed by the UEs in the cellular network, as well as associated traffic flows through the unlicensed and licensed spectrum, the OCS 154 and the OFCS 156 will be able to apply appropriate billing/charging.

As shown in FIG. 3, the framework of the proposed USUMR method 200 is based on the ME 100, which will communicate with the PCEF 160 using ADPs and commands according to the Diameter protocol, over the Gu interface. The USUMR method 200 allows the eNB 40 to play a role in unlicensed spectrum usage monitoring and reporting.

In the prior art, the eNB 40 does not have a role in the users' data usage monitoring and charging/billing architecture for LTE systems. The primary functionality of usage monitoring lies in the PCEF 160, which has interfaces to both the OCS 154 and the OFCS 156, entities that are responsible for charging functionality based on the reports received over the Gy and Gz interfaces, respectively. Thus, the prior art reports do not distinguish between unlicensed and licensed usage. The eNB 40, being the network entity performing resource scheduling over the air interface, has the capability to monitor the unlicensed spectrum usage of UEs in its coverage area. As such, as disclosed herein, the eNB 40 is proposed to perform the following additional tasks:

- The eNB maintains a state variable for each UE configured to track resources consumed by the UE on the unlicensed spectrum.
- When the eNB schedules resources for an UE over the unlicensed spectrum, the eNB updates the state variable by adding the resource amount provisioned over the unlicensed spectrum
- As configured by the PCEF through the Gu interface, the eNB reports the unlicensed spectrum usage to the PCEF FIG. 4 illustrates operation of the unlicensed spectrum usage monitoring element 100 that is part of the eNB 40, according to some embodiments. The operations are presented in a particular order. However, one or more of the operations may take place in an order other than is depicted.

The ME 100 receives instructions from the PCEF 160 about which UEs to monitor (step 1), a process described in more detail below. The ME 100 maintains n state variables, one for each UE to be monitored (step 2). Thus, the n UEs being monitored by the eNB 40 are a subset of all UEs in the cellular network. In FIG. 4, there are n UEs being monitored; thus, n state variables are maintained by the ME 100.

Once the eNB 40 schedules resources over the unlicensed spectrum for a particular UE 50 (step 3), that UE's state variable is updated with the resource amount provisioned (step 4). In FIG. 4, unlicensed spectrum usage for $UE_1$ and $UE_3$ is scheduled.

Once the unlicensed spectrum usage reaches a threshold amount for a particular UE (step 5), the ME 100 prepares an unlicensed spectrum usage report for that UE, using its associated state variable (step 6). Alternatively, step 5 may be triggered by a PCEF request, which is described in more detail below. In FIG. 4, an unlicensed spectrum report is generated only for $UE_1$ and is thus based on state variable $i_1$.

In some embodiments, the USUMR method 200 utilizes the interface Gu between the eNB 40 and the PCEF 160 to facilitate the exchange of measurement and reporting configurations (from the PCEF to the eNB) as well as the actual reporting of unlicensed spectrum usage (from the eNB to the PCEF). The Gu interface employs the Diameter protocol, which is also standardized for various other interfaces (e.g., Gx, Gy, Gz) in the core network.

In some embodiments, the PCEF 160 sends over the Gu interface a measurement and reporting configuration to the eNB 40. This indicates to the eNB which UE or UEs to monitor for unlicensed spectrum usage, after which a report of such usage will be made by the eNB to the PCEF. Each monitoring configuration is uniquely identified by a monitoring key, and is relevant to an UE and one or more of its traffic flows. A single UE may have multiple monitoring keys, one for each configuration assigned to the UE by the PCEF 160. For example, the UE may have one monitoring key to keep track of unlicensed spectrum usage during the day, another monitoring key associated with nighttime operation, and so on.

A single UE may also be associated with one or more traffic flows, each of which may have a different QoS. QoS manages traffic by differentiating subscribers and services to improve overall performance. Network operators divide the traffic into flows based on attributes, such as traffic type (voice, video, control), or application preferences (throughput, latency, jitter) and then transport each flow accordingly. The USUMR method 200 treats each traffic flow distinctly, and different traffic flows for a single UE may have different monitoring and reporting configurations. For example, inside a configuration identified by a monitoring key, usage monitoring on multiple flows can be configured.

Using the USUMR method 200, communication between the eNB 40 and the PCEF 160 may be push-based or pull-based (from the perspective of the PCEF). In push-based operation, the PCEF sends information (for each monitoring and reporting configuration of the UE) to the eNB without prompting from the eNB. In pull-based operation, the PCEF receives a request from the eNB for configuration information.

Attribute-value pairs (AVPs) are fundamental data representations used in computing systems and applications. FIG. 5 is a list of AVPs used by the USUMR method 200, according to some embodiments. These AVPs are specific to the Gu interface and are used by the USUMR method 200 in message exchanges between the eNB 40 and the PCEF 160. Since all the AVPs start with the words, "Unlicensed-Spectrum-Usage", the AVPs referred to herein may be indicated in shorthand. Thus, for example, the Unlicensed-Spectrum-Usage-Monitoring-Key AVP may also be referred to as the Monitoring-Key AVP, the Unlicensed-Spectrum-Usage-Flow-Definition AVP may also be referred to as the Flow-Definition AVP, and so on.

Figure 6A:
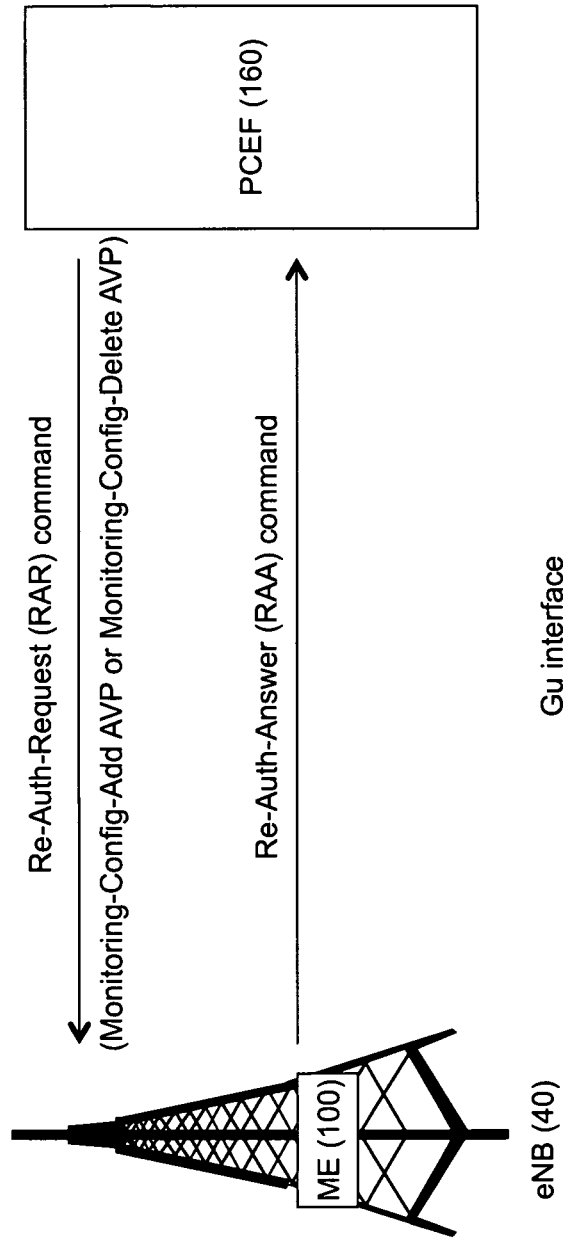
FIGS. 6A and 6B illustrate push- and pull-based monitoring and reporting configuration setup performed by the unlicensed spectrum usage monitoring and reporting method of FIG. 3, according to some embodiments.
Figure 6B:
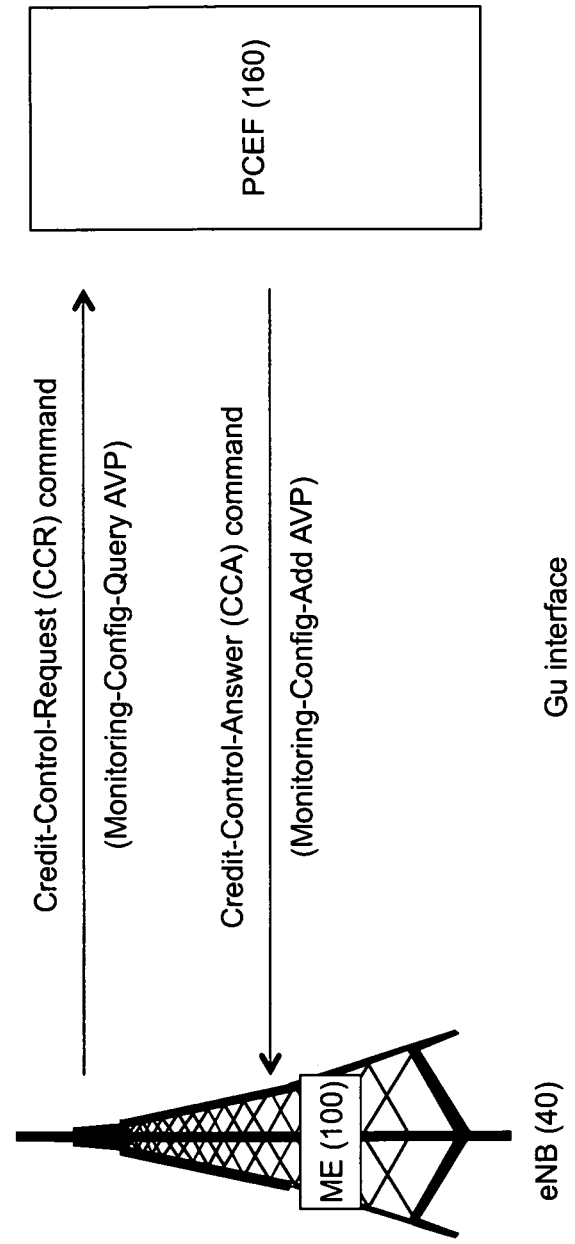
Figure 7A:
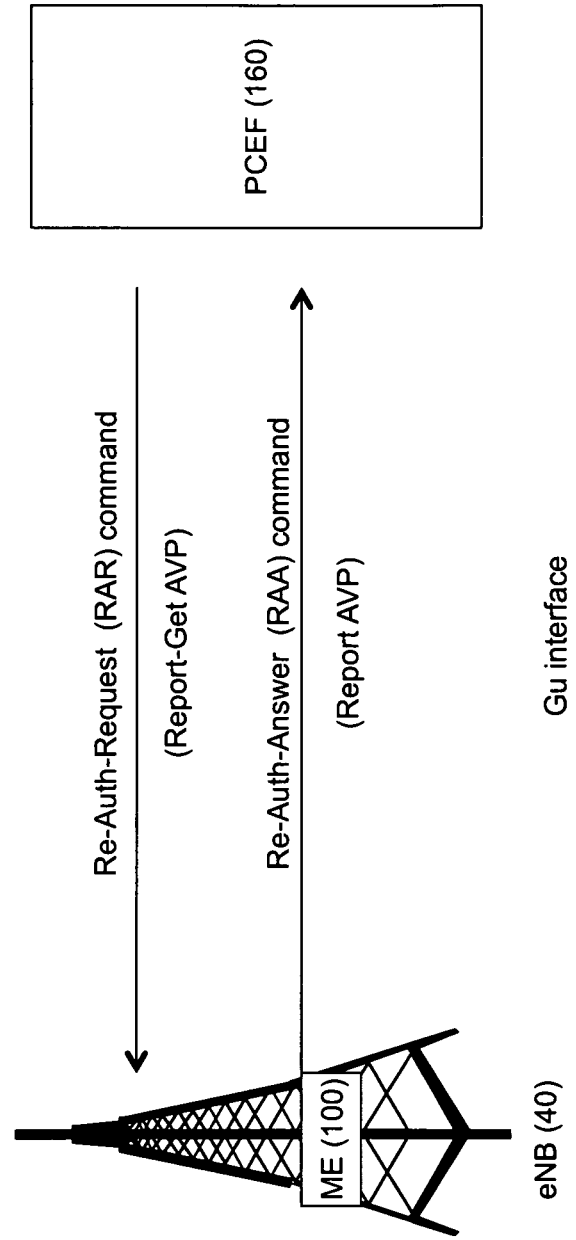
FIGS. 7A and 7B illustrate push- and pull-based reporting performed by the unlicensed spectrum usage monitoring and reporting method of FIG. 3, according to some embodiments.
Figure 7B:
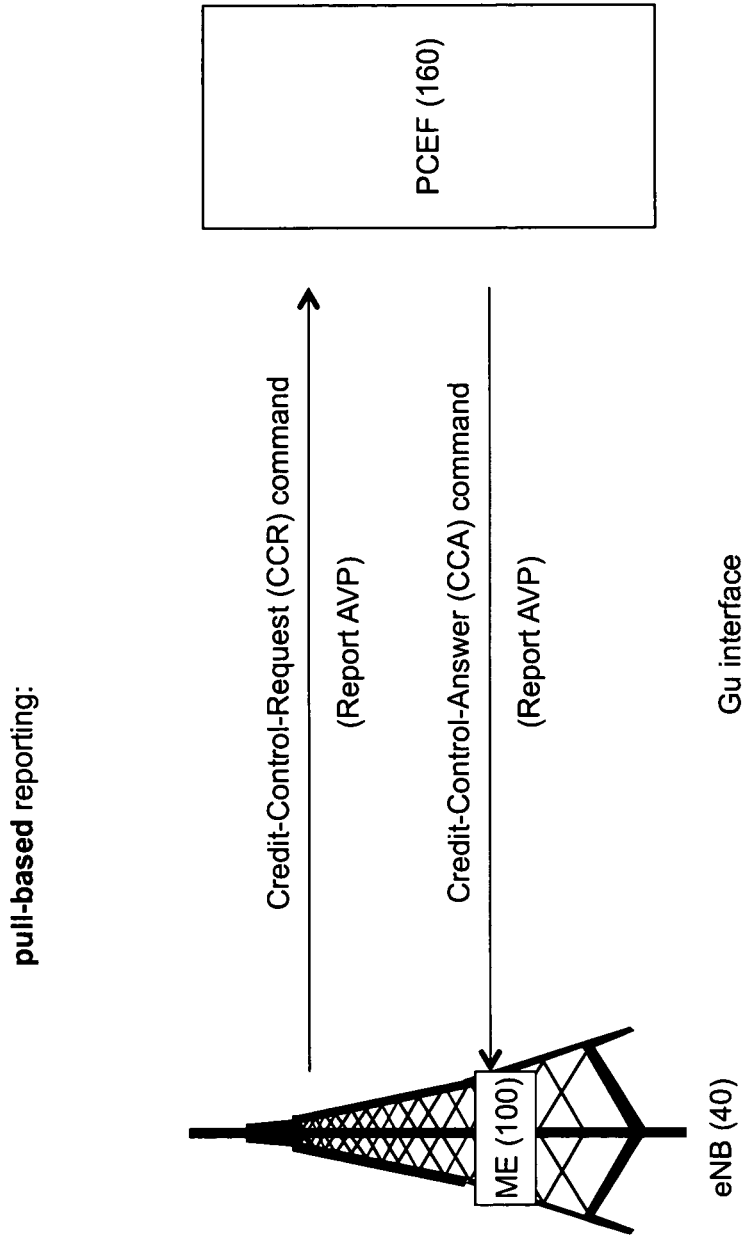

Some of the AVPs in FIG. 5 are used for performing both push- and pull-based operations between the PCEF 160 and the eNB 40. FIGS. 6A and 6B illustrate the push- and pull-based monitoring and reporting configuration operations, respectively, performed by the USUMR method 200. FIGS. 7A and 7B illustrate the push- and pull-based reporting operations, respectively, performed by the USUMR method 200.

In the pushed-based monitoring and reporting configuration operations (FIG. 6A), the PCEF 160 sends the monitoring/reporting configuration to the eNB 40 over the Gu interface in an unsolicited manner. In some embodiments, the PCEF sends a Re-Auth-Request (RAR) command with one or more Monitoring-Config-Add AVPs. This will update any existing monitoring/reporting configuration having the same monitoring key. The PCEF 160 may also instruct the eNB 40 to delete an existing monitoring configuration by including one or more Monitoring-Config-Delete AVPs in the RAR command. The eNB 40 acknowledges the configuration update by sending a Re-Auth-Answer (RAA) command to the PCEF over the Gu interface.

In the pull-based monitoring and reporting configuration operations (FIG. 6B), the eNB 40 solicits the monitoring/reporting configuration from the PCEF 160. In some embodiments, this is done by the eNB 40 sending a Credit-Control-Request (CCR) command with one or more Monitoring-Config-Query AVPs to the PCEF 160. The PCEF 160, in turn, replies with a Credit-Control-Answer (CCA) command with one or more Monitoring-Config-Add AVPs. Each AVP in the PCEF's response contains the unlicensed spectrum usage monitoring/reporting configuration for a UE 50 and one or more of its traffic flows.

After being configured by the PCEF 160 to monitor and report unlicensed spectrum usage by a UE flow or flows, the eNB 40 keeps track of the unlicensed spectrum usage by the UE. As with the configuration initialization, the reporting of the unlicensed spectrum usage may be either push- or pull-based (also from the perspective of the PCEF).

In the push-based reporting operations (FIG. 7A), the PCEF 160 requests unlicensed spectrum usage reports from the eNB 40 by sending a RAR command with one or more Report-Get AVPs, each of which identifies the monitoring/reporting configurations relevant to the reporting sought.

The monitoring/reporting configurations are identified through their monitoring key value. The eNB 40 responds by issuing a RAA command with the Report AVP to the PCEF 160.

In the pull-based reporting operations (FIG. 7B), the eNB 40 sends a CCR command with one or more Report AVPs to the PCEF 160. This may occur, for example, when the eNB 40 determines that the reporting threshold/criteria is met for a particular monitoring/reporting configuration. The PCEF 160 acknowledges receipt of the report by issuing a CCA command to the eNB 40.

The description and formats of these proposed AVPs are given below. FIGS. 8-13 illustrate several of the AVP used by the USUMR method 200 to enable monitoring and reporting configuration (FIGS. 6A and 6B) and reporting (FIGS. 7A and 7B) between the eNB 40 and the PCEF 160.

Unlicensed-Spectrum-Usage-Monitoring-Config-Definition (Monitoring-Config-Definition) AVP:

The Unlicensed-Spectrum-Usage-Monitoring-Config-Definition AVP is used by the USUMR method 200 to define a configuration to be used by the eNB 40 to monitor and report unlicensed spectrum usage of the UE 50 and one or more of its associated traffic flows. In some embodiments, the Monitoring-Config-Definition AVP has a format as depicted in FIG. 8, according to some embodiments. According to the diameter protocol, the "*" before the AVP in the last line of the AVP indicates that the defined AVP can be nested with "0 or more other AVPs". The Monitoring-Config-Definition AVP includes the monitoring key, which is unique to each flow, a UE identifier (ID), a flow definition, a reporting level, and a reporting threshold, as well as the ability to add other AVPs as desired.

Unlicensed-Spectrum-Usage-Monitoring-Key (Monitoring-Key) AVP:

The Monitoring-Key AVP is used by the USUMR method 200 to assign a unique identity of a single unlicensed spectrum usage monitoring configuration. A single UE 50 may include separately defined keys, one for daytime usage, another for nighttime usage, as an example. In some embodiments, each unlicensed spectrum usage report refers to the monitoring key when being sent to the PCEF 160.

Unlicensed-Spectrum-Usage-UE-ID (UE-ID) AVP:

The UE-ID AVP is used by the USUMR method 200 to identify the relevant UE to the eNB 40. In some embodiments, the International Mobile Subscriber Identity, or IMSI, is used as the UE ID for this purpose. The IMSI is a unique identification associated with the UE. The IMSI may be in the Subscriber Identity Module (SIM) card of a cellphone, for example. Operations performed by the USUMR method 200 to obtain the IMSI for the UE are described in more detail below.

Unlicensed-Spectrum-Usage-Flow-Definition (Flow-Definition) AVP:

The Flow-Definition AVP (FIG. 9) identifies a specific traffic flow associated with the UE relevant to the configuration. Each UE may be associated with one or more flows, and the Flow-Definition AVP is used to distinguish between the different flows. Like the Monitoring-Key AVP, the Flow-Definition AVP is found inside the Monitoring-Config-Definition AVP (FIG. 8).

Unlicensed-Spectrum-Usage-Reporting-Level (Reporting-Level) AVP:

The Reporting-Level AVP determines the level at which the usage reporting is to be done by the USUMR method 200. The reporting level could be either "UE level", in which all flows of the UE are reported using the same criteria, or "flow level", in which each UE flow is defined differently. If the reporting level is designated as "flow level", then, in some embodiments, the configuration identifies at least one traffic flow through the Flow-Definition AVP.

Unlicensed-Spectrum-Usage-Reporting-Threshold (Reporting-Threshold) AVP:

The Reporting-Threshold AVP contains the value of the unlicensed spectrum usage (relevant to the identified UE and traffic flow), which, in some embodiments, is used as a threshold to trigger reporting to the PCEF 160 by the eNB 40. The reporting threshold value is given in nearest octets, in some embodiments.

Unlicensed-Spectrum-Usage-Monitoring-Config-Add (Monitoring-Config-Add) AVP:

One or more Monitoring-Config-Add AVPs (FIG. 10) is used by the PCEF 160 in a CCA or RAR command to instruct the eNB 40 to add or update monitoring and reporting configurations, as described above and illustrated in FIGS. 6A and 6B.

Unlicensed-Spectrum-Usage-Monitoring-Config-Query (Monitoring-Config-Query) AVP:

The Monitoring-Config-Query AVP (FIG. 11) is used by the eNB 40 in a CCR command diameter message to request unlicensed usage monitoring/reporting configuration from the PCEF 160 in an unsolicited manner (pull-based), as described above and illustrated in FIG. 6B.

Unlicensed-Spectrum-Usage-Report (Report) AVP:

The Report AVP (FIG. 12) contains the unlicensed spectrum usage report sent by the eNB 40 to the PCEF 160. The Monitoring-Key field in the Report AVP identifies the monitoring/reporting configuration relevant to the usage report.

Unlicensed-Spectrum-Usage-Report-ID (Report-ID) AVP:

In some embodiments, for a given monitoring/reporting configuration, the USUMR method 200 may generate multiple reports over time. The Report-ID AVP helps differentiate these reports at the PCEF 160. Each usage report is uniquely identified by a combination of Monitoring-Key and Report-ID AVPs.

Unlicensed-Spectrum-Usage-Last-Reporting-Time (Last-Reporting-Time) AVP:

The Last-Reporting-Time AVP allows the PCEF 160 to know the starting time of the reported usage in the current report being supplied to it by the eNB 40.

Unlicensed-Spectrum-Usage-Amount (Amount) AVP:

The value of the Amount AVP is the amount of reported unlicensed spectrum usage by the eNB 40 for a given unlicensed spectrum usage monitoring configuration. In some embodiments, the amount of reported unlicensed spectrum usage is given to the nearest octets.

Unlicensed-Spectrum-Usage-Report-Get (Report-Get) AVP:

One or more of the Report-Get AVPs (FIG. 13) is used by the PCEF 160, in a RAR command diameter message, to instruct the eNB 40 to send an unlicensed spectrum usage report (i.e., pull-based usage reporting). The Report-Get AVP contains one or more Monitoring-Key AVPs that identify the configuration(s) for which the report(s) are requested.

In addition to the AVPs of FIG. 5, the USUMR method 200 employs several messages that are used over the Gu interface between the eNB 40 and the PCEF 160. These messages are commands that actually convey the above AVPs. The messages include a Credit Control Request (CCR) command, a Credit Control Answer (CCA) command, a Re-Auth Request (RAR) command, and a Re-Auth Answer (RAA) command. FIGS. 14-17 illustrate the command formats used by the USUMR method 200, in some embodiments.

Credit-Control-Request (CCR) Command:

The CCR command, indicated by the Command-Code field set to 272 and the "R" bit set in the Command Flags field, is sent by the eNB 40 to the PCEF 160 to request monitoring rules for unlicensed spectrum or to report unlicensed spectrum usage. FIG. 6B illustrates one example in which the CCR command is used by the eNB 40 to solicit the monitoring/reporting configuration from the PCEF 160. FIG. 7B illustrates a second example in which the CCR command is used by the eNB 40 when the reporting threshold/criteria is met for one or more unlicensed spectrum usage monitoring/reporting configurations and the eNB wants to send a report to the PCEF 160.

In some embodiments, the CCR Command has a format as depicted in FIG. 14. Both the Monitoring-Config-Query and Report AVPs (shown in bold-faced type) are embedded within the command.

CC-Answer (CCA) Command:

The CCA command, indicated by the Command-Code field set to 272 and the "R" bit cleared in the Command Flags field, is sent by the PCEF 160 to the eNB 40 in response to the CCR command. The CCA command is used to provision unlicensed spectrum usage monitoring configurations to the eNB 40 and to acknowledge the receipt of the unlicensed spectrum usage report from the eNB. FIG. 6B illustrates one example in which the CCA command (from the PCEF 160 to the eNB 40) follows the CCR command (from the eNB to the PCEF).

In some embodiments, the CCA Command has a format as depicted in FIG. 15. The Monitoring-Config-Add AVP (shown in bold-faced type) is embedded within this command.

Re-Auth-Request (RAR) Command:

The RAR command, indicated by the Command-Code field set to 258 and the "R" bit set in the Command Flags field, is sent by the PCEF 160 to the eNB 40 to unsolicitedly provision unlicensed spectrum usage monitoring configuration using the push-based procedure. FIG. 6A illustrates one example in which the RAR command is used by the PCEF 160 to solicit the monitoring/reporting configuration from the eNB 40. FIG. 7A illustrates a second example in which the RAR command is used by the PCEF 160 to solicit the reporting of a UE flow by the eNB 40.

In some embodiments, the RAR Command has a format as depicted in FIG. 16. The Monitoring-Config-Add, Monitoring-Config-Delete, and Report-Get AVPs (shown in bold-faced type) are embedded within this command.

Re-Auth-Answer (RAA) Command:

The RAA command, indicated by the Command-Code field set to 258 and the "R" bit cleared in the Command Flags field, is sent by the eNB 40 to the PCEF 160 in response to the RAR command. The RAA command is used by the eNB 40 to send the unlicensed spectrum usage report to the PCEF 160 following a report request solicited by the PCEF 160 (as illustrated in FIG. 7A).

In some embodiments, the RAA Command has a format as depicted in FIG. 17. The Usage-Report AVP (shown in bold-faced type) is embedded within this command.

As described above, in some embodiments, the USUMR method 200 uses the IMSI as the UE identification when configuring and reporting data consumption of a UE 50 over the unlicensed spectrum. Alternatively, other mechanisms for uniquely identifying the UE may be used. The eNB 40 currently does not have access to a UE's IMSI. Therefore, in some embodiments, a messaging enhancement is employed so that the eNB 40 can relate a UE 50 and its traffic to its IMSI, which is used for reporting unlicensed spectrum usage to the PCEF 160. In some embodiments, the following new radio resource control (RRC) messages are utilized for obtaining the IMSI of the UE 50.

Figure 1:
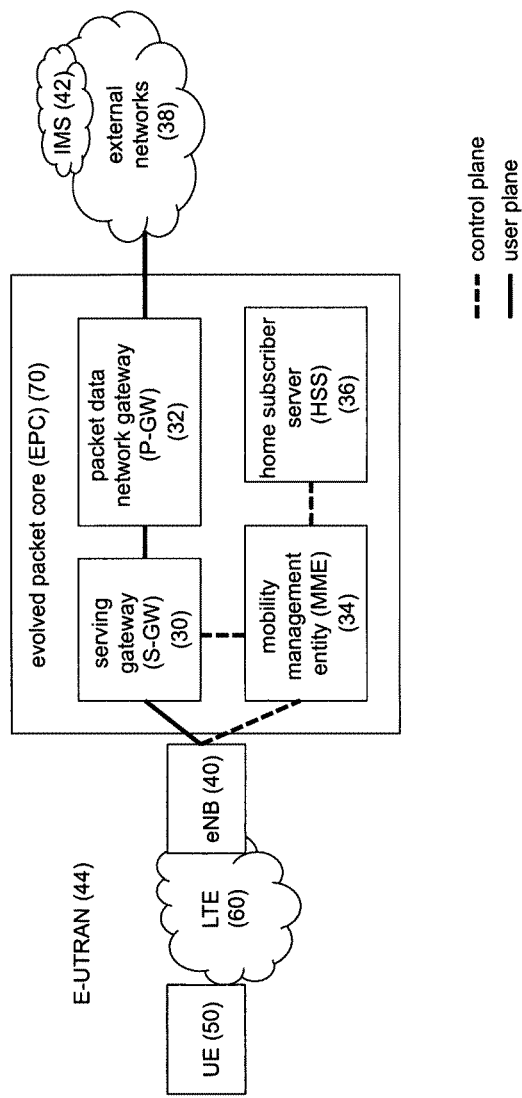
FIG. 1 is a diagram of an Evolved Packet System architecture with E-UTRAN access environment suitable for the unlicensed spectrum usage monitoring and reporting method of FIG. 3, according to some embodiments.

IdentityRequest:

If certain UE identities (e.g., IMSI) are not accessible to the eNB 40 by default, but are known to the UEs, in some embodiments, the eNB asks the UE 50 for the IMSI. The USUMR method 200 uses an IdentityRequest message to request such identities from the UE 50. The IdentityRequest message, along with IdentityRequest field descriptions, is illustrated in FIG. 18, according to some embodiments. The E-UTRAN specified in the IdentityRequest message is, in essence, the eNB 40 (see also FIG. 1).

IdentityResponse:

The IdentityResponse message is used by the UE 50 to respond to the IdentityRequest message received from the eNB 40. The proposed IdentityResponse message, along with IdentityResponse field descriptions, is illustrated in FIG. 19, according to some embodiments.

Example Flow of Interactions in the Proposed Framework

In FIGS. 20A-20D, according to some embodiments, four different example flows of interaction among different network entities in the USUMR method 200 are illustrated. The relevant entities, also illustrated in FIG. 3, are the PCRF 130, the PCEF 160, the eNB 40, the UE 50, and the OCS 154 and the OFCS 156. The interactions illustrated in FIGS. 20A-20D are denoted numerically. However, one or more of the indicated operations may take place in an order other than is specified. The Gu interface between the PCEF 160 and the eNB 40 is depicted using thick dotted lines, and the arrow indicates the direction of operation (eNB→PCEF or PCEF→eNB).

Figure 20A:
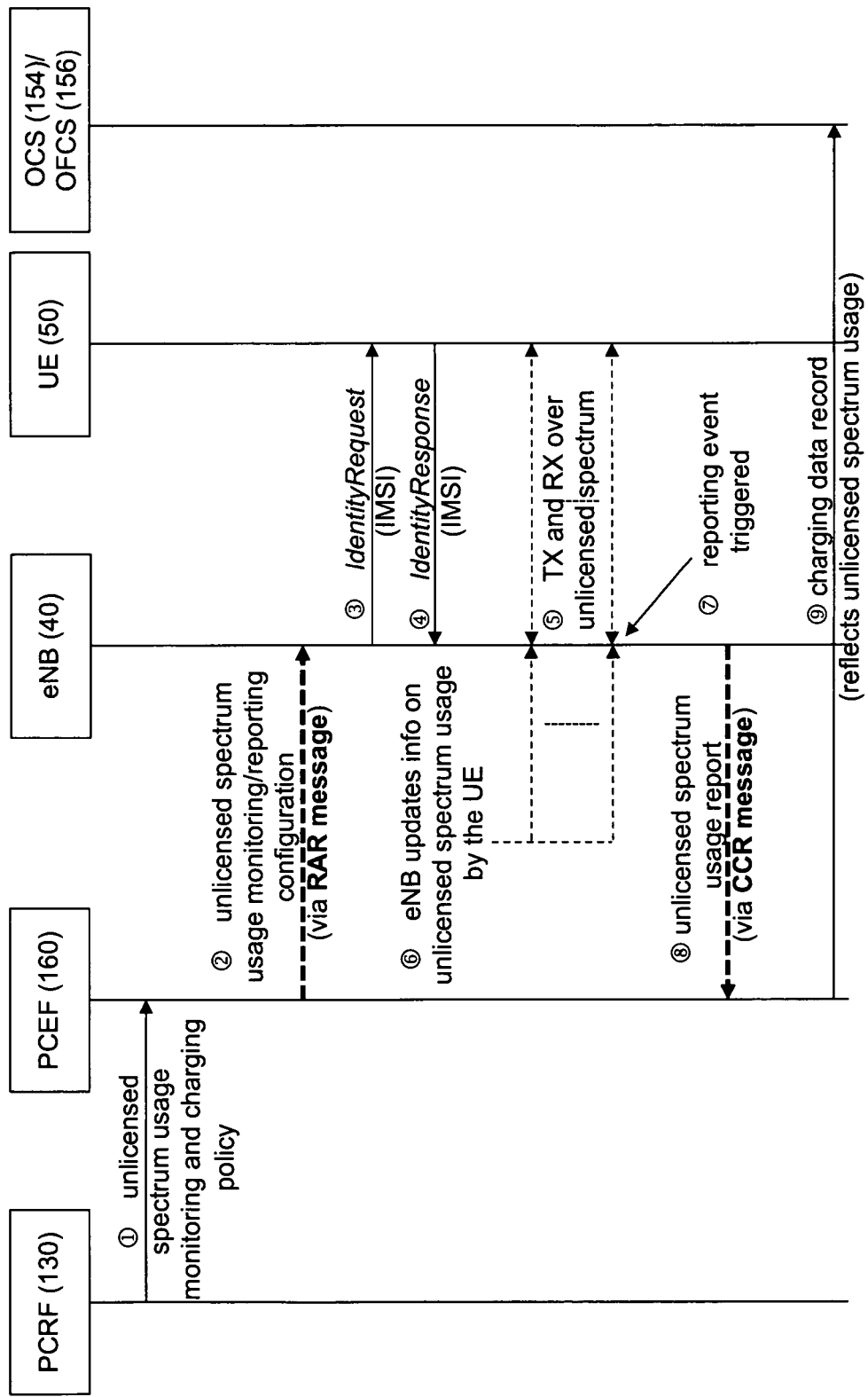
FIGS. 20A-20D are example flows of interactions between LTE network entities in implementing the unlicensed spectrum usage monitoring and reporting method of FIG. 3, according to some embodiments.

Looking first at FIG. 20A, before any unlicensed spectrum usage monitoring can take place, the PCRF 130 sends the rules to the PCEF 160 (step 1). In the illustrated embodiment, a push-based configuration (initiated by the PCEF) takes place. Thus, the PCEF 160 issues a RAR message command (FIG. 16) to the eNB 40 to unsolicitedly provision unlicensed spectrum usage monitoring configuration (step 2). Because the eNB 40 is directed to monitor and report unlicensed spectrum usage by the UE 50, the eNB benefits by having a unique identifier for the UE. In this example, the IMSI of the UE 50 (which is known to the UE) is requested by the eNB 40, using the IdentityRequest command (FIG. 18) (step 3). The UE 50 provides the IMSI in an IdentityResponse command (FIG. 19) (step 4).

Once a unique ID (IMSI) is known to the eNB 40, transmissions between the eNB and UE 50, both licensed and unlicensed, take place (step 5). The eNB 40, or, more specifically, the ME 100 inside the eNB, updates the state variable associated with the UE 50 and updates the state variable (FIG. 4) as the unlicensed spectrum is provisioned by the eNB (step 6).

Recall that one of the available AVPs is the Reporting-Threshold AVP. In some embodiments, the reporting threshold assigned to the UE 50 triggers a reporting event once the threshold is reached (step 7). Accordingly, using the CCR command, the eNB 40 supplies an unlicensed spectrum usage report to the PCEF 160 (step 8), this example being a pull-based operation. This enables the PCEF 160 to send a charging data record, reflecting the unlicensed spectrum usage by the UE 50 associated with the received IMSI, to the online charging system (OCS) 154 and the offline charging system (OFCS) 156 (step 9). The operations of the unlicensed spectrum usage monitoring and reporting method 200 are thus complete.

Figure 20B:
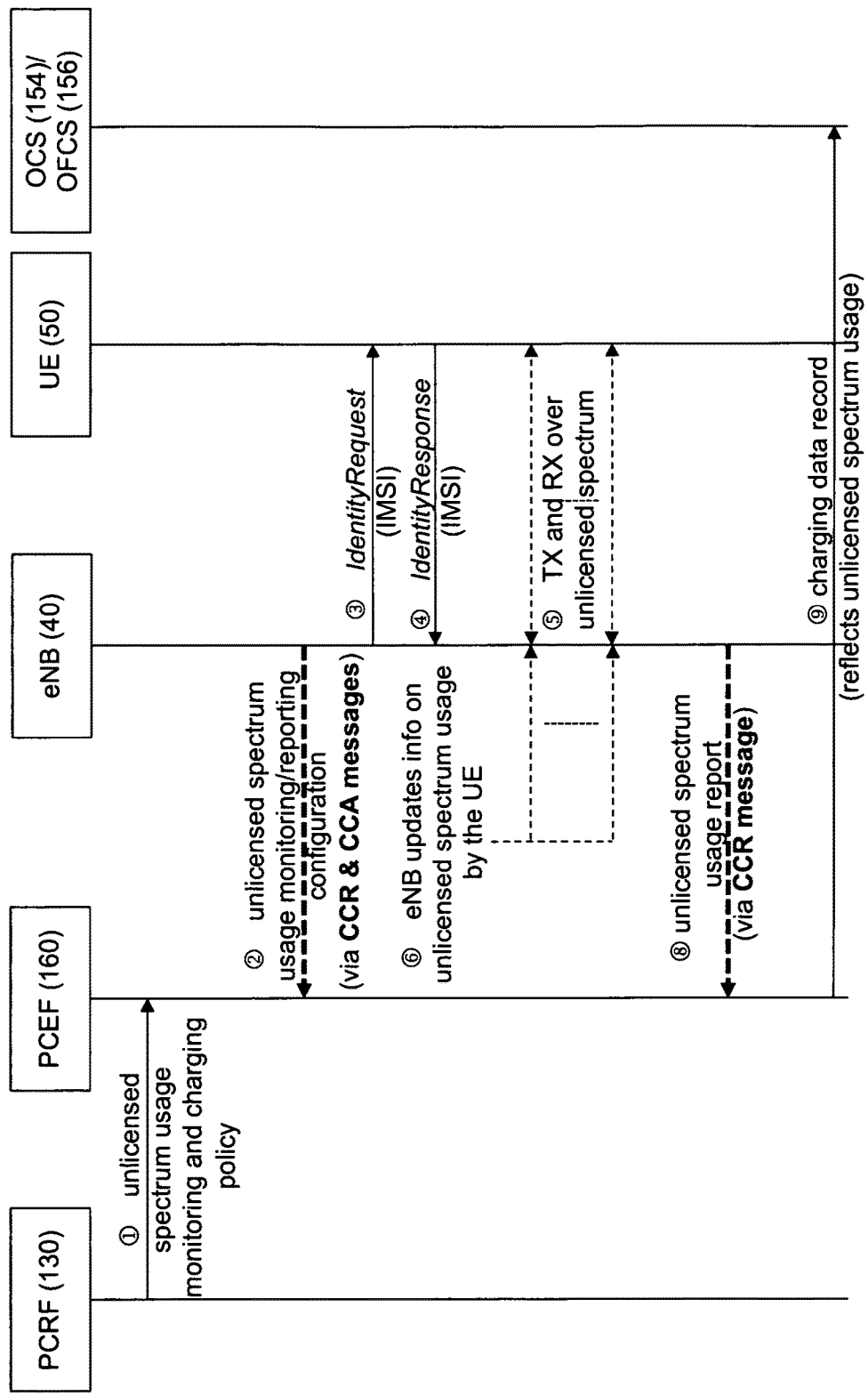

In another embodiment, as illustrated in FIG. 20B, step 2 is replaced with a pull-based configuration operation in which the eNB 40 requests a configuration for unlicensed spectrum monitoring and reporting of a UE, as in FIG. 6B, which includes a CCR command from the eNB 40 to the PCEF 160, followed by a CCA command from the PCEF to the eNB. In this example, no reporting event is triggered (step 7), since the PCEF initiates the unlicensed spectrum usage report.

Figure 20C:
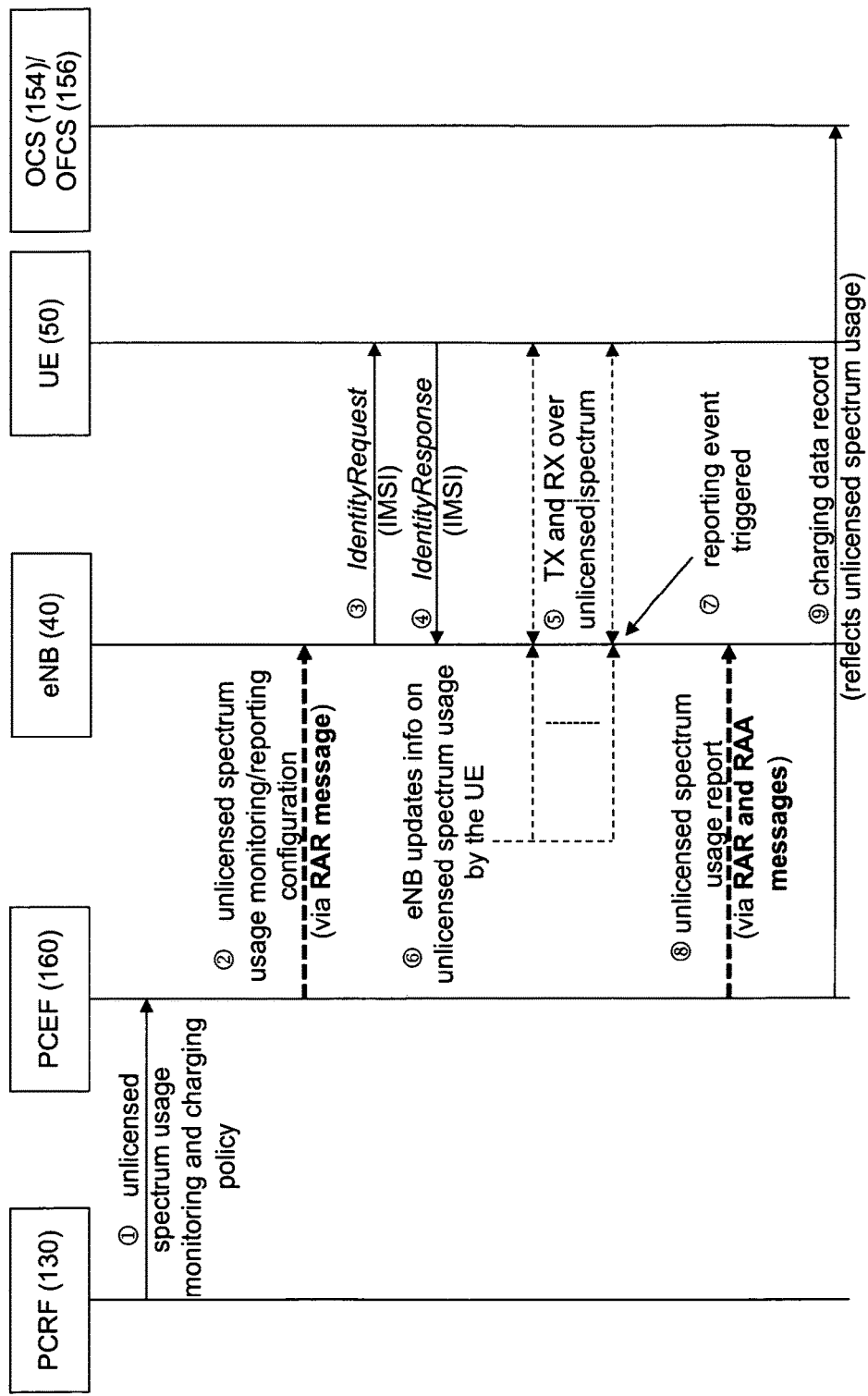

In another embodiment, as illustrated in FIG. 20C, step 8 is replaced with a push-based reporting operation in which the PCEF 160 requests monitoring and reporting of a UE 50, as in FIG. 7A, which includes a RAR command from the PCEF 160 to the eNB 40, followed by a RAA command from the eNB to the PCEF.

Figure 20D:
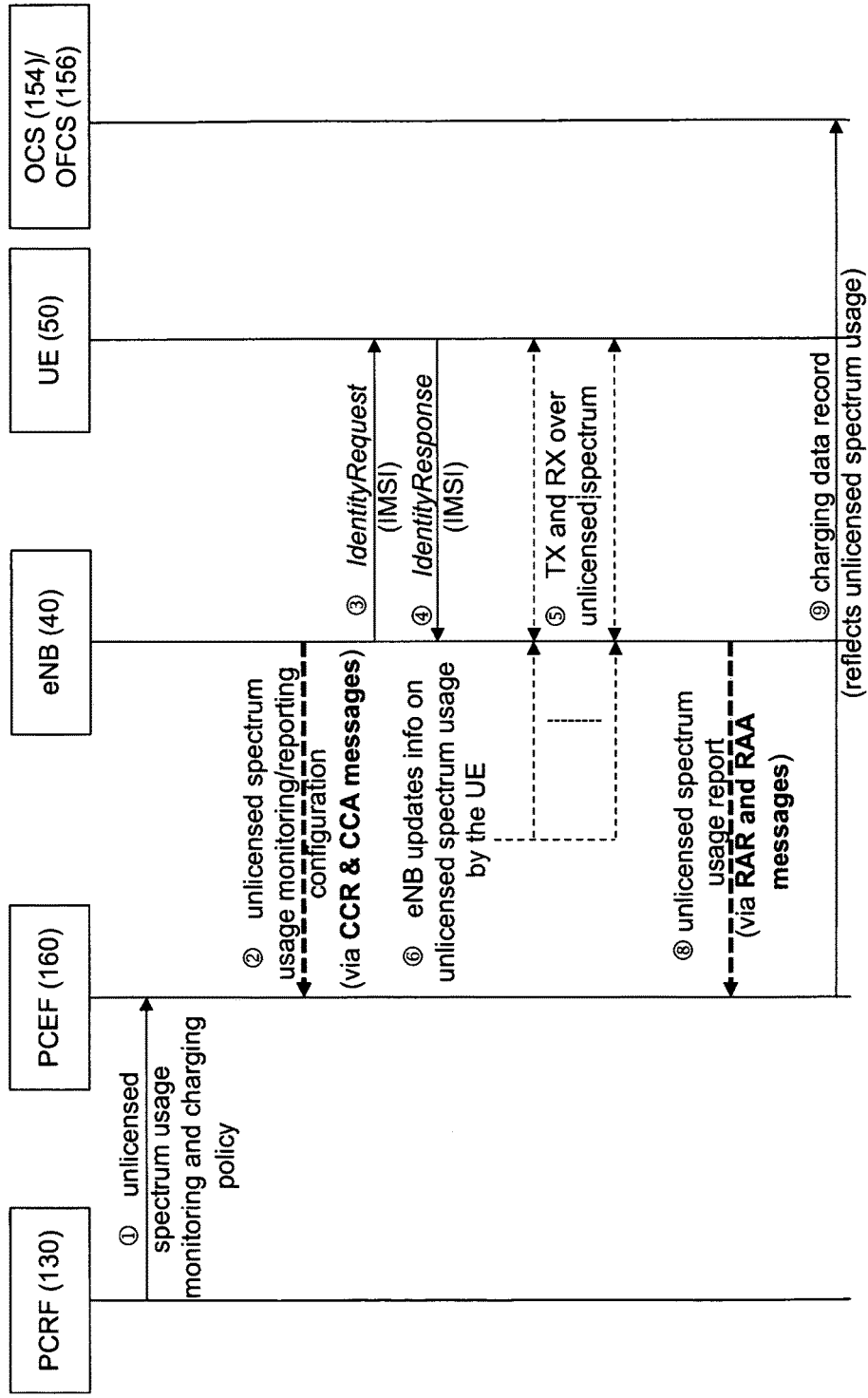

In another embodiment, as illustrated in FIG. 20D, step 2 is a pull-based configuration operation using the CCR and CCA commands and step 8 is replaced with a push-based reporting operation. In this example, no reporting event is triggered, since the PCEF initiates the unlicensed spectrum usage report.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer-readable storage medium can be a computer-readable storage medium that does not include a signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a computer module, a processing module, and/or a clock module or timer module. One or more programs that may implement or utilize the various techniques described herein may use an application programming interface (API), reusable controls, and the like. Such programs may be implemented in a high-level procedure or object-oriented programming language to communicate with a computer system. However, the program(s) may be implemented in assembly or machine language, if desired. In any case, the language may be a compiled or interpreted language, and combined with hardware implementations.

It should be understood that many of the functional units described in the specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may be not physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or means that a particular feature, structure, or characteristic described in connection with the example is included in at least one embodiment disclosed herein. Thus, appearances of the phrases, "in an example" or "in some embodiments" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations. Furthermore, the described features, structures, or characteristics may be combined in any suitable manner in one or more embodiments.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in or functions associated with the circuitry may be implemented by one or more software or firmware modules. In some embodiments, circuitry may include logic, at least partially operable in hardware.

Figure 21:
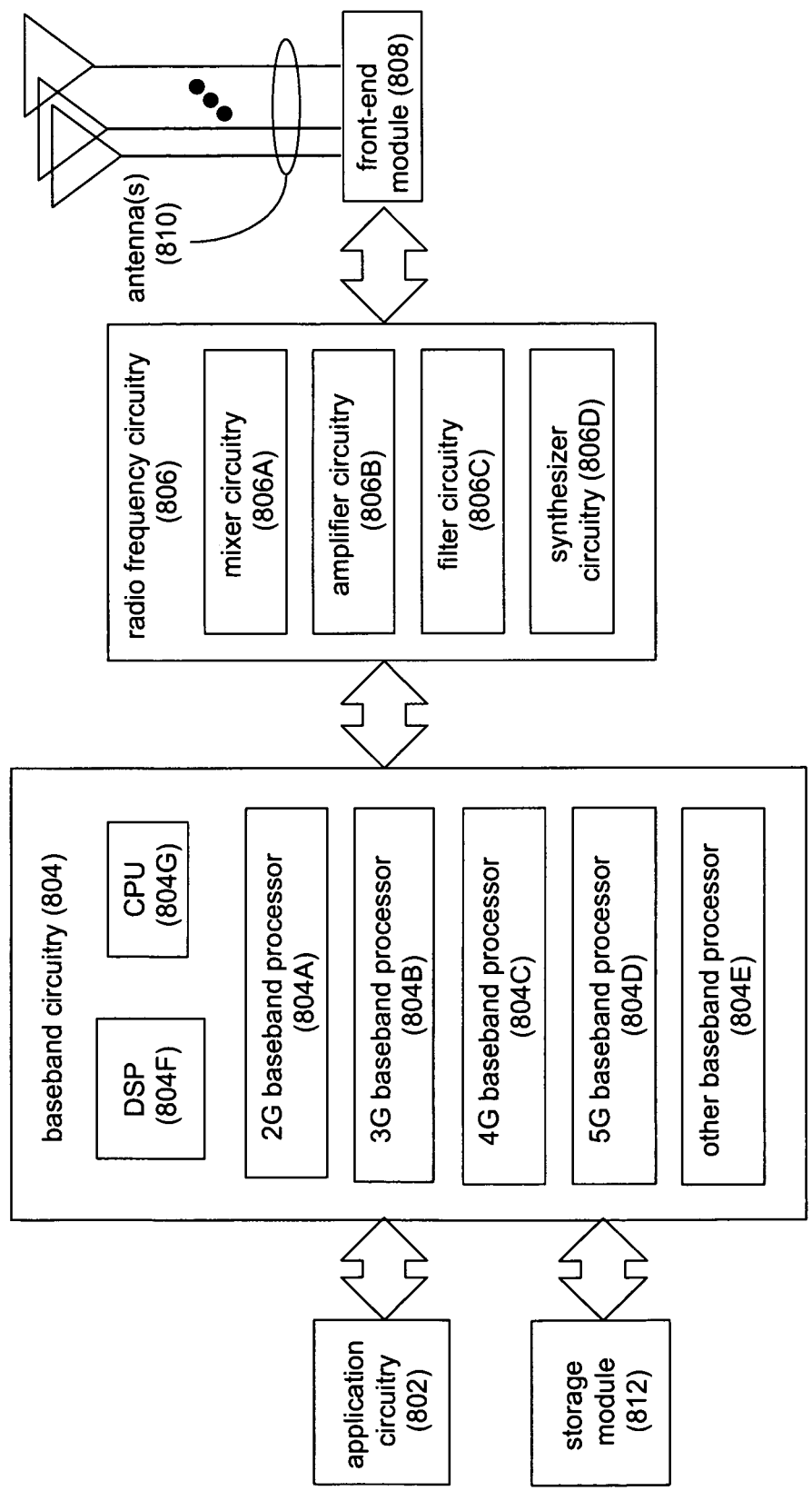
FIG. 21 is a simplified block diagram of a UE whose unlicensed spectrum usage may be monitored by the unlicensed spectrum usage monitoring and reporting method of FIG. 3, according to some embodiments.

Embodiments described herein may be implemented into a system using any suitably configured hardware and/or software. FIG. 21 illustrates, for one embodiment, example components of an enhanced NodeB (eNB) device 800, of which the eNB 40 in previous illustrations may be an example. In some embodiments, the eNB device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage unit 812 or other memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804A, third generation (3G) baseband processor 804B, fourth generation (4G) baseband processor 804C, and/or other baseband processor(s) 804D for other existing generations, generations in development, or to be developed in the future (e.g., fifth generation (5G), 6G, etc.). The baseband circuitry 804 (e.g., one or more of baseband processors 804A-D) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be configured to run elements of the protocol stack for signaling of the PHY, MAC, RLC, PDCP, and/or RRC layers. In some embodiments, the baseband circuitry may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with a EUTRAN and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B and filter circuitry 806C. The transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers and may be arranged for quadrature downconversion and/or upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry may be arranged for direct downconversion and/or direct upconversion, respectively. In some embodiments, the mixer circuitry 806A of the receive signal path and the mixer circuitry of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806D of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 806D may be configured to generate a carrier frequency as the output frequency, while in other embodiments, the output frequency may be a multiple of the carrier frequency (e.g., twice the carrier frequency, four times the carrier frequency), and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the eNB device 800 may include additional elements such as, for example, memory/storage, display, camera, sensor, and/or input/output (I/O) interface.

In summary, the unlicensed spectrum usage monitoring and reporting (USUMR) method 200 can be implemented, as a first example, in an enhanced NodeB (eNB) to perform unlicensed spectrum usage monitoring and reporting of one or more entities in a wireless cellular network operating according to a Long-Term Evolution (LTE) standard, the eNB comprising a monitoring element to maintain a state variable, the state variable to be associated with a monitoring and reporting configuration of a user equipment (UE), wherein the monitoring element updates the state variable in response to unlicensed spectrum usage being assigned to the UE, wherein the eNB configures and reports unlicensed spectrum usage by the monitoring and reporting configuration.

Further to the first example or any other example discussed herein, in a second example, the monitoring element further comprises a first command to request one or more monitoring rules for the monitoring and reporting configuration of the UE and report unlicensed spectrum usage by the monitoring and reporting configuration in response to a request from the PCEF, wherein the first command is sent across an interface to the PCEF.

Further to the second example or any other example discussed herein, in a third example, the eNB comprises a second command to acknowledge the establishment of one or more monitoring rules for the monitoring and reporting configuration of the UE, and report unlicensed spectrum usage by the monitoring and reporting configuration without receiving a request from the PCEF, wherein the second command is sent across the interface to the PCEF.

Further to the third example or any other example discussed herein, in a fourth example, the eNB comprises a first radio resource control (RRC) message used to request a unique identifier from the UE.

Further to the fourth example or any other example discussed herein, in a fifth example, the unique identifier is an international mobile subscriber identity (IMSI)

Further to the third example or any other example discussed herein, in a sixth example, the eNB further comprises an attribute-value pair (AVP) to assign a unique identity to the monitoring and reporting configuration.

Further to the third example or any other example discussed herein, in a seventh example, the eNB further comprises an attribute-value pair (AVP) to define the monitoring and reporting configuration.

Further to the third example or any other example discussed herein, in an eighth example, the eNB further comprises an attribute-value pair (AVP) to specify a traffic flow, wherein the traffic flow is based on a type of traffic performed by the UE.

Further to the eighth example or any other example discussed herein, in a ninth example, the type of traffic by the UE is either voice, video, or control.

Further to the third example or any other example discussed herein, in a tenth example, the eNB further comprises an attribute-value pair (AVP) to be received from the PCEF, wherein the AVP is used to either update the monitoring and reporting configuration or to add a second monitoring and reporting configuration of the UE.

Further to the third example or any other example discussed herein, in an eleventh example, the eNB further comprises an attribute-value pair (AVP) to be used in the second command to request the monitoring and reporting configuration from the PCEF.

Further to the third example or any other example discussed herein, in a twelfth example, the eNB further comprises an attribute-value pair (AVP) to enable the eNB to report unlicensed spectrum usage to the PCEF.

Further to the third example or any other example discussed herein, in a thirteenth example, the eNB further comprises an attribute-value pair (AVP) to be received from the PCEF, wherein the eNB reports unlicensed spectrum usage by the monitoring and reporting configuration in response to the AVP.

Further to the first example or any other example discussed herein, in a fourteenth example, the unlicensed spectrum is utilized through carrier aggregation.

Further to the second example or any other example discussed herein, in a fifteenth example, the interface employs a diameter-based protocol.

Further, the unlicensed spectrum usage monitoring and reporting (USUMR) method 200 can be implemented, as a sixteenth example, in an apparatus of an enhanced node B (eNB) operating according to a Long-Term Evolution (LTE) standard in a wireless cellular network, the apparatus comprising an unlicensed spectrum usage monitoring element comprising commands to be sent across the interface to the PCEF, the commands comprising a first command to enable an unlicensed spectrum usage report to be sent in response to a request from the PCEF, and a second command to enable an unlicensed spectrum usage report to be sent without receiving a request from the PCEF.

Further to the sixteenth example or any other example discussed herein, in a seventeenth example, the unlicensed spectrum usage report is requested by the PCEF.

Further to the sixteenth example or any other example discussed herein, in an eighteenth example, the unlicensed spectrum usage report is triggered once the state variable reaches a predetermined threshold.

Further to the sixteenth, seventeenth, or eighteenth examples or any other example discussed herein, in a nineteenth example, the unlicensed spectrum usage monitoring element receives instructions from the PCEF indicating n user equipment (UE) of the wireless cellular neighborhood to monitor, maintains n state variables, one for each UE to be monitored, updates a state variable of the n state variables, wherein the state variable indicates a resource amount of a particular UE to be provisioned, and prepares the unlicensed spectrum usage report using the state variable.

Further to the sixteenth, seventeenth, eighteenth, or nineteenth examples or any other example discussed herein, in a twentieth example, the unlicensed spectrum usage monitoring element further comprising attribute-value pairs (AVPs), the AVPs comprising a first AVP to be received from the PCEF over an interface, the interface to employ a diameter-based protocol, wherein the apparatus reports unlicensed spectrum usage by the monitoring and reporting configuration in response to the first AVP, and a second AVP to be used in the second command to request the monitoring and reporting configuration from the PCEF.

Further to the twentieth example or any other example discussed herein, in a twenty-first example, the the AVPs further comprise a third AVP to be received from the PCEF over the interface, wherein the third AVP is used to either update the monitoring and reporting configuration or to add a second monitoring and reporting configuration of the UE.

Further to the sixteenth, seventeenth, eighteenth, or nineteenth examples or any other example discussed herein, in a twenty-second example, the unlicensed spectrum usage monitoring element further comprising attribute-value pairs (AVPs), the AVPs comprises a first AVP to enable the eNB to report unlicensed spectrum usage to the PCEF, and a second AVP to assign a unique identity to the monitoring and reporting configuration.

Further to the sixteenth, seventeenth, eighteenth, or nineteenth examples or any other example discussed herein, in a twenty-third example, the unlicensed spectrum usage monitoring element further comprising attribute-value pairs (AVPs), the AVPs comprises a first AVP to define the monitoring and reporting configuration, and a second AVP to specify a traffic flow, wherein the traffic flow is based on a type of traffic performed by the UE.

Further to the twentieth, twenty-first, twenty-second, or tenth-third examples or any other example discussed herein, in a twenty-fourth example, the unlicensed spectrum usage monitoring element further comprises a first radio resource control (RRC) message used to request a unique identifier from the UE.

Further, the unlicensed spectrum usage monitoring and reporting (USUMR) method 200 can be implemented, in a twenty-fifth example, in an article comprising a computer-readable medium comprising instructions to cause an electronic device, upon execution of instructions by one or more processors of the electronic device, to maintain a state variable, the state variable to be associated with a monitoring and reporting configuration of a user equipment (UE), wherein the monitoring element updates the state variable in response to unlicensed spectrum usage being assigned to the UE, and report unlicensed spectrum usage by the UE based on the state variable.

While the foregoing examples are illustrative of the principles in one or more particular applications, it will be apparent to those of ordinary skill in the art that numerous modifications in form, usage, and details of implementation can be made without the exercise of inventive faculty, and without departing from the principles and concepts herein and will appreciate numerous modifications and variations therefrom. It is intended that the appended claims cover all such modifications and variations as fall within the true spirit and scope of the disclosed embodiments.

We claim:

1. An enhanced node B (eNB) to perform unlicensed spectrum usage monitoring and reporting of one or more User Equipment (UE) in a wireless cellular network operating according to a Long-Term Evolution (LTE) standard, the eNB being capable of scheduling resources over both unlicensed and licensed spectrum at an air interface, the eNB comprising:
 a monitoring element to maintain a state variable associated with a UE, wherein the monitoring element updates the state variable in response to unlicensed spectrum usage being assigned to the UE, the monitoring element further to:
  invoke a radio resource control (RRC) message to obtain a unique identifier from the UE; and
  utilize one more Attribute-Pair Values (APVs) and message commands to report the state variable to a Policy and Charging Enforcement Function (PCEF), wherein a dedicated interface is disposed between the eNB and the PCEF and a diameter-based protocol is used for communication between the eNB and the PCEF;
wherein the PCEF sends the unlicensed spectrum usage by the UE to both an Online Charging System (OCS) and an Offline Charging System (OFCS) via second and third dedicated interfaces, respectively.

2. The eNB of claim 1, the monitoring element further to invoke:
 a first command to:
  request one or more monitoring rules for the monitoring and reporting configuration of the UE; and
  report unlicensed spectrum usage by the monitoring and reporting configuration in response to a request from the PCEF;
wherein the first command is sent across an interface to the PCEF.

3. The eNB of claim 2, the monitoring element further to invoke:
 a second command to:
  acknowledge the establishment of one or more monitoring rules for the monitoring and reporting configuration of the UE; and
  report unlicensed spectrum usage by the monitoring and reporting configuration without receiving a request from the PCEF;
wherein the second command is sent across the interface to the PCEF.

4. The eNB of claim 3, the monitoring element further to invoke:
 an attribute-value pair (AVP) to assign a unique identity to the monitoring and reporting configuration.

5. The eNB of claim 3, the monitoring element further to invoke:
 an attribute-value pair (AVP) to define the monitoring and reporting configuration.

6. The eNB of claim 3, the monitoring element further to invoke:
 an attribute-value pair (AVP) to specify a traffic flow, wherein the traffic flow is based on a type of traffic performed by the UE.

7. The eNB of claim 6, wherein the type of traffic by the UE is either voice, video, or control.

8. The eNB of claim 3, the monitoring element further to invoke:
 an attribute-value pair (AVP) to be received from the PCEF, wherein the AVP is used to either update the monitoring and reporting configuration or to add a second monitoring and reporting configuration of the UE.

9. The eNB of claim 3, the monitoring element further to invoke:
 an attribute-value pair (AVP) to be used in the second command to request the monitoring and reporting configuration from the PCEF.

10. The eNB of claim 3, the monitoring element further to invoke:
 an attribute-value pair (AVP) to enable the eNB to report unlicensed spectrum usage to the PCEF.

11. The eNB of claim 3, the monitoring element further to invoke:
 an attribute-value pair (AVP) to be received from the PCEF, wherein the eNB reports unlicensed spectrum usage by the monitoring and reporting configuration in response to the AVP.

12. The eNB of claim 2, wherein the interface employs a diameter-based protocol.

13. The eNB of claim 1, wherein the unique identifier is an international mobile subscriber identity (IMSI).

14. The eNB of claim 1, wherein the unlicensed spectrum is utilized through carrier aggregation.

15. An apparatus of an enhanced node B (eNB) operating according to a Long-Term Evolution (LTE) standard in a wireless cellular network, the apparatus comprising:
 an unlicensed spectrum usage monitoring element to utilize commands to be sent across a dedicated interface to a Policy and Charging Enforcement Function (PCEF) wherein the unlicensed spectrum usage monitoring element:
  receives instructions from the PCEF indicating n user equipment (UE) of the wireless cellular neighborhood to monitor, wherein n is a non-zero integer equal to or greater than 2;
  maintains n state variables, one for each UE to be monitored;
  updates a state variable of the n state variables, wherein the state variable indicates a resource amount of a particular UE to be provisioned; and
  prepares the unlicensed spectrum usage report using the state variable;
wherein the eNB issues an IdentityRequest command to each UE to obtain a unique identity of the UE;
the commands comprising:
 a first command to enable an unlicensed spectrum usage report to be sent in response to a request from the PCEF; and
 a second command to enable an unlicensed spectrum usage report to be sent without receiving a request from the PCEF.

16. The apparatus of claim 15, wherein the unlicensed spectrum usage report is requested by the PCEF.

17. The apparatus of claim 15, wherein the unlicensed spectrum usage report is triggered once the state variable reaches a predetermined threshold.

18. The apparatus of claim 15, the unlicensed spectrum usage monitoring element further comprising attribute-value pairs (AVPs), the AVPs comprising:
 a first AVP to be received from the PCEF over an interface, the interface to employ a diameter-based protocol, wherein the apparatus reports unlicensed spectrum usage by the monitoring and reporting configuration in response to the first AVP; and a second AVP to be used in the second command to request the monitoring and reporting configuration from the PCEF.

19. The apparatus of claim 18, the AVPs further comprising:
    a third AVP to be received from the PCEF over the interface, wherein the third AVP is used to either update the monitoring and reporting configuration or to add a second monitoring and reporting configuration of the UE.

20. The apparatus of claim 18, the unlicensed spectrum usage monitoring element further comprising:
    a first radio resource control (RRC) message used to request a unique identifier from the UE.

21. The apparatus of claim 15, the unlicensed spectrum usage monitoring element further comprising attribute-value pairs (AVPs), the AVPs comprising:
    a first AVP to enable the eNB to report unlicensed spectrum usage to the PCEF; and
    a second AVP to assign a unique identity to the monitoring and reporting configuration.

22. The apparatus of claim 15, the unlicensed spectrum usage monitoring element further comprising attribute-value pairs (AVPs), the AVPs comprising:
    a first AVP to define the monitoring and reporting configuration; and
    a second AVP to specify a traffic flow, wherein the traffic flow is based on a type of traffic performed by the UE.

\* \* \* \* \*